United States Patent [19]

Handke et al.

[11] 4,371,280
[45] Feb. 1, 1983

[54] SHACKLE ASSEMBLY FOR MOTOR VEHICLE COMPRESSION STRUTS

[75] Inventors: Günther Handke, Euerbach; Hans Hepp, Schweinfurt, both of Fed. Rep. of Germany

[73] Assignee: Fichtel & Sachs AG, Schweinfurt, Fed. Rep. of Germany

[21] Appl. No.: 169,720

[22] Filed: Jul. 17, 1980

[30] Foreign Application Priority Data

Aug. 8, 1979 [DE] Fed. Rep. of Germany ....... 2932138

[51] Int. Cl.³ ................................................ F16B 2/08
[52] U.S. Cl. ..................................... 403/13; 403/191; 403/283; 29/150
[58] Field of Search ............. 24/221 R; 403/283, 388, 403/13, 191; 29/464, 150

[56] References Cited

U.S. PATENT DOCUMENTS 2,004,182 6/1935 Arey ...................................... 29/150
2,295,913 9/1942 Phelps .

FOREIGN PATENT DOCUMENTS 2556137 6/1977 Fed. Rep. of Germany ...... 403/388
2231555 12/1974 France .
2244638 4/1975 France .

*Primary Examiner*—Andrew V. Kundrat
*Attorney, Agent, or Firm*—Toren, McGeady and Stanger

[57] ABSTRACT

A shackle assembly for fastening of compression struts at the steering knuckle in the wheel suspension of a motor vehicle is formed with an inner and an outer strap member, the straps being adapted to be arranged together to define a compression strut span within which a compression strut may be received. Holes are formed in both the inner and outer strap member through which fastening screws are received. The holes are defined through the strap members at a location outside of the compression strut span with the holes extending through the inner strap member being formed with a larger diameter than the holes defined through the outer strap member.

18 Claims, 7 Drawing Figures

SHACKLE ASSEMBLY FOR MOTOR VEHICLE COMPRESSION STRUTS

The present invention relates generally to motor vehicle suspension support systems and more particularly to a shackle utilized to attach the compression strut of the vehicle at a steering knuckle of the vehicle wheel suspension. The invention is particularly related to the type of assembly wherein the shackle is comprised of an outer enveloping strap and an inner counter strap arranged concentrically about a compression strut span within which a compression strut may be received, with holes being provided extending through the straps to receive therethrough the fastening screws for the assembly.

Shackles of the type to which the present invention relates are generally utilized to attach the compression struts of a vehicle with the wheel suspension of the vehicle wheels. It is common practice to construct steering knuckles as a unitary member together with the compression strut in order to obtain a transition to the wheel which is completely free of play. This type of construction tends to be expensive and complicated and always requires exact adjustment of the compression struts to the steering knuckle design of only one specific type of vehicle. Fine adjustment of the chassis unit therefore becomes very complicated. Initially, a changeover was effected to enclose the foot of the compression strut with an enveloping strap supported with a counter strap. Furthermore, the two straps were welded to a shackle and then the shackle was screw threaded or attached to the steering knuckle. The required screw passages are usually drilled. The bores must have ridges removed on all sides and must be polished. Refinishing of the bores tends to be complicated and expensive. Furthermore, drilling is a relatively complicated operational process which can delay production to a considerable degree.

In view of the foregoing, the present invention is directed toward provision of a shackle assembly of the type described above wherein the hole of the assembly may be prepared in a more economical manner enabling the production of a safer assembly which is free of disturbances and which will guarantee a secure fit of the compression strut at the steering knuckle of a vehicle.

SUMMARY OF THE INVENTION

Briefly, the present invention may be described as a shackle assembly for fastening the compression struts of a motor vehicle at the steering wheel knuckles of the vehicle comprising an outer enveloping strap and inner counter strap with the straps being adapted to be arranged together to define a compression strut span within which a compression strut may be received. Holes which are adapted to receive therein fastening screws are formed to extend through both the inner and the outer straps with the holes being located outside of the compression strut span. The principal features of the invention are achieved in that the inner holes which are formed at the inner counter strap are dimensioned with a larger diameter than the outer holes which are formed in the outer enveloping strap.

In a preferred embodiment of the invention it is provided that the inner holes are between 0.2 to 1.0 mm and preferably 0.5 mm, larger than the outer holes. It is considered advantageous that the holes are punched and that at least the inner holes are allowed to remain in their crude punched state with the inner counter strap and the outer enveloping strap being connected with each other by welding, in a manner known per se, with the outer holes and the inner holes lying essentially concentrically relative to each other.

With the measure in accordance with the invention, a shackle is created wherein the holes may be formed using relatively inexpensive procedures such as punching. In the punched holes, refinishing may be performed with relatively little expenditure inasmuch as burrs are eliminated. Due to the narrow tolerance at the outer holes in the outer enveloping strap, a very secure fastening is insured. A larger hole at the inner counter strap permits a less complicated assembly and becomes the support after attachment of the compression strut.

In one embodiment it is provided that the smaller outer holes are allowed to remain in the crude punched state whereby the larger inner holes receive burrs which occur at the punching outlet sides of the outer bores. As a result of these measures, the punching burrs need not be removed, or at least not to the same extent as would be necessary with drilled holes. Thus there results a significant shorter station time for this procedure during the manufacturing operation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings.

FIG. is a side view of a shackle assembly arranged in accordance with the present invention.

DETAILED DESCRIPTION OF THE PREFERRED EMBODIMENTS

Figure 2:
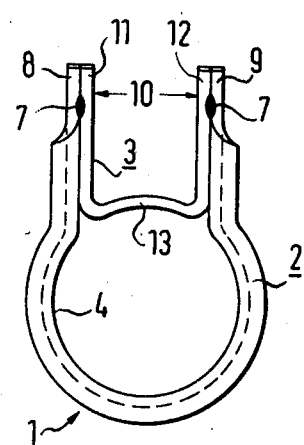
FIG. 2 is a top view of a shackle in accordance with the assembly of FIG. 1 taken in the direction of the compression strut.
Figure 3:
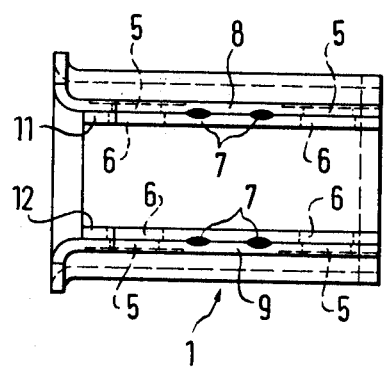
FIG. 3 is a front view of the shackle depicted in FIGS. 1 and 2.

Referring now to the drawings wherein similar reference numerals are used to identify like parts throughout the various figures thereof, a shackle assembly in accordance with the present invention is depicted as comprising a shackle 1 including an outer enveloping strap 2 which for attachment to a steering knuckle (not shown) is provided with enveloping strap sides 8 and 9 extending essentially parallel with each other. The enveloping strap sides 8 and 9 which extend parallel are spaced apart a distance 10, as particularly shown in FIG. 2, and converge to a partial arc of a circle in the form of an approximately circular compression strut span 4 within which a compression strut may be received.

A counter strap 3 which is also provided with parallel extending sides 11 and 12 is inserted in the spacing 10.

The enveloping strap 2 and the counter strap 3 are welded to each by means of spot or projection welds 7. The outer ends of the strap lie above one another. Inwardly toward the compression strut span 4, the counter strap sides 11 and 12 merge into a web 13 which is structured to provide a counter strap concavity and converge at this point.

The concave counter strap 13 represents in the region of the counter strap 3 the end portion of the compression strut span 4. Therefore, a compression strut (not shown) may be held in the compression strut span 4. Such a compression strut is either clamped in or also welded within the compression strut span 4.

Figure 4:
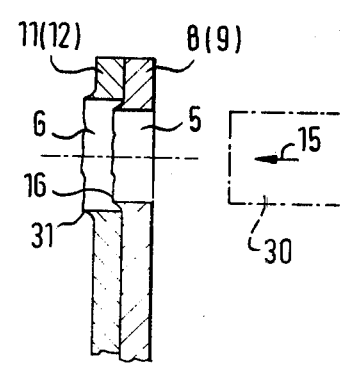
FIG. 4 is a partial sectional view showing in greater detail the holes of the shackle.

In the area of the strap sides 8 and 11, or 9 and 12, the sides are provided with punched holes 5 and 6. As seen in FIG. 4, the holes 6 located inside of the counter strap sides 11 and 12 will have a somewhat larger diameter than the holes 5 located outside at the enveloping straps sides 8 and 9. The difference in diameter may vary. At a hole diameter of about 12 mm the difference may be approximately 0.5 mm. The inner holes 6 are left in their crude punched state and the outer holes 5 are finished to the appropriate bolt dimensions.

The punching tools utilized for the punching operation are guided from the outside and move so that a punched arc will lie on the outside of the holes. The bores are prepunched and during welding they are located to be as concentric relative to each other as posible. At each side 8 and 9 or 11 and 12 at least two holes 5 or 6 are provided. The projection welds 7 are placed between these holes 5 and 6 and preferably two welds 7 are provided for each pair of sides 8 and 11 and 9 and 12. The holes 5 and 6 may be provided with contacts 14 located inside and/or outside, as may be desired in accordance with appropriate requirements.

The punching tool guided from the outside in the punching direction 15, as best seen in FIG. 4, results in that the punching outlet side will be provided with arcs in the form of burrs 16. The larger inner holes 6 are dimensioned in such a way that they concentrically receive the burrs 16 or the smaller outer holes 5. The sides 8 and 9 of the enveloping strap therefore lie with their entire surfaces at the sides 11 and 12 of the counter strap which facilitates welding and improves the welded joint.

Figure 5:
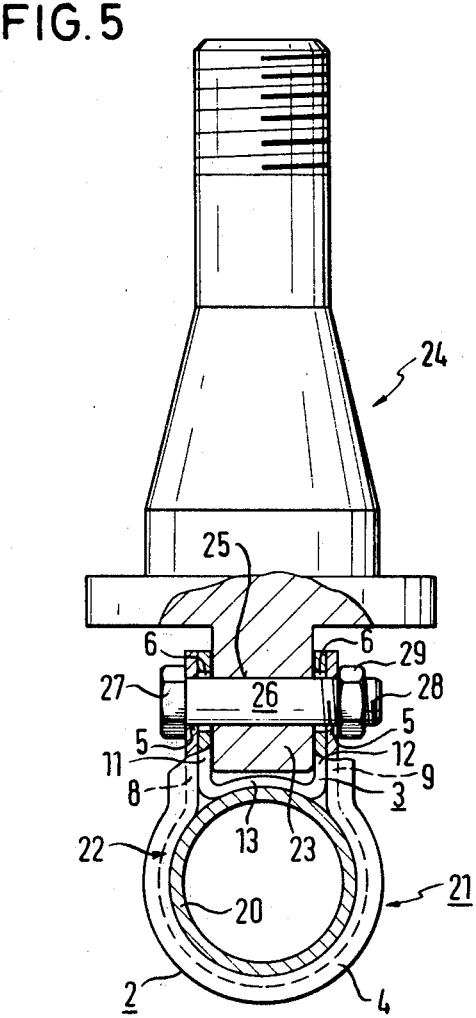
FIG. 5 is a partial sectional view showing the connection of the shackle with a steering knuckle.

In FIG. 5, the outer tube of a compression strut 20 is inserted into a shackle 21 particularly in its enveloping ring 22. A flange 23 of a steering knuckle 24 is then inserted between the sides 11 and 12 of the counter strap. The flange 23 is provided with bores 25 which have the same diameter as the holes 5 of the sides 8 and 9 of the enveloping strap.

Fastening bolts 26 are then passed through the holes 5 and 6 and the bores 25. The diameter of the fastening bolts 26 corresponds approximately to the diameter of the holes 5 and the bores 25. The fastening bolts 26 are provided at one end with a bolt head 27 and at their other end with a thread 28 onto which a tightening nut 29 is screwed. In this manner, the tube 20 is firmly clamped in the enveloping ring 22 and simultaneously the fastening flange 23 is clamped between the sides 11, 12 of the counter strap.

Since the diameter of the fastening bolt 26 is equal to the inner diameter of the bore 25 and is equal to the inner diameter of the holes 5 and the sides 8, 9 of the enveloping strap, the fastening flange 23 will be held in the shackle 21 in a locked manner and will not be movable independently of the clamp fit.

Figure 6:
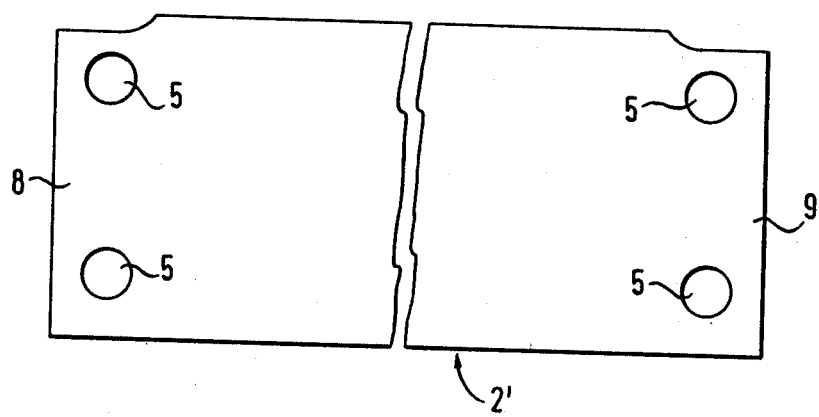
FIG. 6 is a plan view showing a blank utilized in the formation of an enveloping strap.

As can be best seen in FIG. 6, the enveloping strap 2 is made of a flat blank 2' and the holes 5 are punched into the blank 2' with the blank 2' being subsequently bent into the shape of the strap 2 in accordance with FIGS. 1–5.

Figure 7:
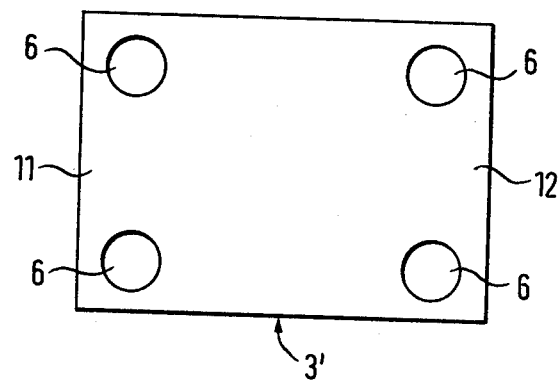
FIG. 7 is a plan view showing a blank for the formation of a counter strap.

FIG. 7 shows a flat blank 3' from which the counter strap 3 is made. Holes 6 are punched into the flat blank 3' and these holes have a somewhat larger diameter than the holes 5. Punching of the holes 5 occurs by means of a stamping punch 20 shown in FIG. 4 in outline only in order to depict the punching direction.

The punching of the holes 5 and 6 occurs as long as the blanks 2' and 3' have not yet been joined together. After punching of the holes 5 and 6 into the blanks 2' and 3', the blanks are bent into the form shown particularly in FIG. 2 and they are assembled together in the form shown in FIG. 2 so that the outline of the holes 5 will be located within the outline of the somewhat larger holes 6.

Subsequently the enveloping strap 2 and the counter strap 3 are spot welded together with the formation of a welded joint 7. Assembly of the enveloping strap 2 and the counter strap 3 is greatly facilitated by means of the different diameters of the holes 5 and 6 inasmuch as the care which is required is only such that the outlines of the holes 5 are brought to lie within the outlines of the holes 6. Thus, no special attention is required with regard to effecting exact concentricity of the holes 5 and 6. In this manner, unavoidable deviations from desired dimensions, which result during bending of the enveloping strap 2 and the counter strap 3, will be compensated for and it will still be possible by means of alignment of the holes 5 to the diameter of the fastening bolt 26 to achieve an exact locked connection between the shackle 21 and the fastening flange 23.

It is also possible to finish the holes 5 after punching by means of a drilling tool or reaming tool. This finishing can occur at the flat blanks 2' after the punching operation or it can also occur after the shackle is completed and an assembly according to FIG. 2 has been formed.

Finishing is not absolutely required inasmuch as the holes 5 will be formed with sufficient accuracy during the punching operation. As shown in FIG. 4, burrs 16 which may possibly remain in the holes 5 after the punching operation will penetrate into the holes 6 of the sides 11 and 12 of the counter strap when the counter strap is inserted into the enveloping strap. Thus, contact between the full surfaces of the sides 11, 12 of the counter strap and the sides 8, 9 of the enveloping strap will be guaranteed even if no refinishing or removal of burrs 16 occurs. This is a very advantageous aspect of the invention particularly with regard to the formation of good welded joints 7.

The holes 6 in the counter strap sides 11, 12 are punched in the same punching direction as shown in FIG. 4 so that abutment of the burrs of the holes 5 and the holes 6 will not occur during assembly of the counter strap in the enveloping strap.

Burrs 31, as seen in FIG. 4, which might possibly result during punching of the holes 6 will not interfere with the assembly and they will be pressed together during tightening of the nuts 29 so that removal of the burrs 31 will not be necessary by a refinishing operation of the holes 6.

Figure 1:
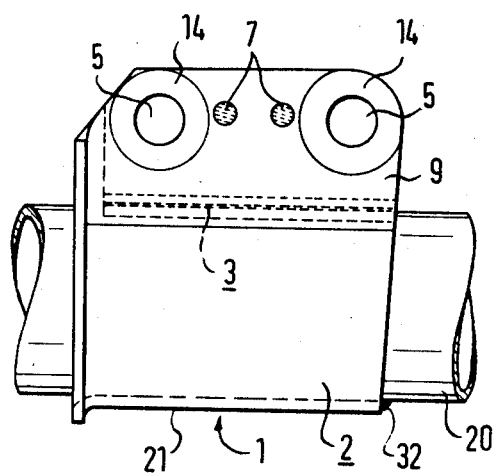

If it is desired not to construct the connection between the shackle 21 and the outer tube 20 merely as a pure clamping connection, then it would be possible without difficulty to apply spot welds 32 between the outer tube 20 and the shackle 21, as shown in FIG. 1.

While specific embodiments of the invention have been shown and described in detail to illustrate the application of the inventive principles, it will be understood that the invention may be embodied otherwise without departing from such principles.

What is claimed is:

1. A shackle assembly for fastening compression struts at steering knuckles in the wheel suspension of a motor vehicle comprising: an outer enveloping strap; an inner counter strap; said straps being arranged together to define a compression strut span within which a compression strut may be received; means defining holes adapted to receive therein fastening screws extending through both said inner and said outer straps, said holes being located in portions of said straps other than the portions thereof defining said compression strut span; said holes defined through said dinner counter strap being formed with a larger diameter than the holes defined through said outer enveloping strap.

2. An assembly according to claim 1 wherein said holes in said inner strap are between approximately 0.2 to 1.0 mm larger than said holes in said outer strap.

3. An assembly according to claim 2 wherein said holes in said inner strap are approximately 0.5 mm larger than said holes in said outer strap.

4. An assembly according to claim 1 wherein said holes in said inner and outer straps are formed as punched holes with at least the holes in said inner strap being retained in an unfinished punched state in said assembly.

5. An assembly according to claim 1 wherein said holes in said outer strap are formed with a punching operation thereby forming burrs, with said holes being left in an unfinished state so that said burrs will extend to within said larger holes in said inner strap when said straps are in assembled position.

6. A process for manufacturing a shackle assembly for fastening compression struts at steering knuckles in the wheel suspension of a motor vehicle comprising the steps of providing a pair of generally flat material blanks adapted to be formed, respectively, into an enveloping strap and a counter strap for said assembly; punching in each of said material blanks holes at selected predetermined locations, said holes being adapted to receive therethrough fastening bolts for said assembly, with the holes in said material blank adapted to form said counter strap being made with a larger diameter than the holes in said material blank adapted to form said enveloping strap; bending said material blanks to form an enveloping strap and a counter strap and assembling said straps together with said holes in said enveloping strap lying essentially radially within the outlines of said holes in said counter strap; said counter strap and said enveloping strap being thus formed and assembled to define a generally circular enclosure within which a compression strut may be received, said assembled straps having a pair of generally planar parallel sides extending outwardly from said enclosure to define a spacing therebetween within which a steering knuckle part may be received; said straps being thus configured so that said holes are formed through said parallel sides to receive therethrough a bolt which may also extend through a hole formed in said steering knuckle part; each of the sides of one of said straps being in abutting relationship, respectively, with one of the sides of the other of said straps, said straps each including a generally circular portion extending between said parallel sides thereof defining a part of said circular enclosure.

7. A method according to claim 6 wherein said straps are joined together with the parallel sides of said counter strap located in abutting relationship and between the parallel sides of said enveloping strap, said holes in said enveloping strap sides being punched therethrough in a given direction toward the side of said counter strap.

8. A method according to claim 6 wherein said holes in said counter strap sides are formed as punched holes which are left in an unfinished condition in said assembly.

9. A method according to claim 6 wherein a compression strut part is introduced into said circular enclosure, wherein a steering knuckle part having a hole therein is introduced in said spacing between said parallel walls of said straps, said hole in said steering knuckle part being placed in alignment with said holes of said straps, wherein fastening bolts are placed to extend through said holes in said straps and through said hole in said steering knuckle part, wherein said steering knuckle part is dimensioned to be essentially in contact with said sides of said counter strap essentially free of play therebetween and wherein said fastening bolts are tightened to secure and clamp said steering knuckle part between said sides of said counter strap.

10. A shackle assembly for fastening compression struts at steering knuckles in the wheel suspension of a motor vehicle comprising: an outer enveloping strap; an inner counter strap; said straps being arranged together to define a compression strut span within which a compression strut may be received; means defining holes adapted to receive therein fastening screws extending through both said inner and said outer straps, said holes being located in portions of said straps other than the portions thereof defining said compression strut span; said holes defined through said inner counter strap being formed with a larger diameter than the holes defined through said outer enveloping strap; said inner strap and said outer strap being joined together by welds with said holes in said outer strap and said holes in said inner strap being arranged generally concentrically relative to each other.

11. A shackle assembly for fastening compression struts at steering knuckles in the wheel suspension of a motor vehicle comprising:
   an outer enveloping strap including a pair of sides and a web;
   an inner counter strap including a pair of sides and a web;
   said sides of said straps being juxtaposed in pairs to receive between said pairs a part of a steering knuckle;
   said straps being arranged together with their webs located to define a compression strut span within which a compression strut may be received;
   means defining holes in the sides of said straps adapted to receive therein fastening bolt means extending through said sides of both said inner and said outer straps;
   said holes defined through the sides of said inner counter strap being formed with a larger diameter than the holes defined through the sides of said outer enveloping strap, with said holes in the sides of both said outer strap and said inner strap being arranged generally concentrically relative to each other.

12. A shackle assembly for fastening together a steering knuckle including a clamping flange having a bore extending therethrough and a compression strut including an outer tube with a shackle which connects said clamping flange and said outer tube, said shackle comprising:
an enveloping strap having two enveloping strap sides which extend essentially parallel to each other and an enveloping strap web which connects said two enveloping strap sides;
a counter strap having two counter strap sides which extend essentially parallel to each other and a counter strap web which connects said two counter strap sides;
said counter strap sides being juxtaposed with said enveloping strap sides in pairs with said counter strap web together with said enveloping strap web being arranged together to complete an enveloping ring arranged to support therein said outer tube of said compression strut;
aligned holes extending through both said enveloping strap and said counter strap sides;
said juxtaposed sides of said counter strap and said enveloping strap being adapted to receive therebetween said clamping flange of said steering knuckle with said aligned holes being arranged in alignment with said bore;
a fastening bolt extending through said aligned holes and said bore to secure said clamping flange between said juxtaposed strap sides and to secure said outer tube within said enveloping ring defined by said enveloping strap and counter strap webs;
the aligned holes in said enveloping strap sides generally corresponding in diameter with the diameter of said fastening bolt with the aligned holes in said counter strap sides being larger in diameter than the aligned holes in said enveloping strap sides, said holes being produced before said enveloping strap and said counter strap are assembled together.

13. An assembly according to claim 12 wherein said aligned holes in said enveloping strap sides and said counter strap sides extend over their entire length throughout each of said respective sides with an essentially constant inner cross-section.

14. An assembly according to claim 12 wherein said aligned holes have ends thereof which are remote from said clamping flange of said steering knuckle and which are limited essentially at plane lateral surfaces of said sides of said enveloping strap and said counter strap.

15. An assembly according to claim 12 wherein at least a plurality of said aligned holes are produced by a punching operation.

16. An assembly according to claim 15 wherein the aligned holes in said enveloping strap sides are formed with punch burrs which extend into the holes in said counter strap sides.

17. An assembly according to claim 12 wherein said bore in said clamping flange is formed with an inner cross-section which corresponds approximately to the outer cross-section of said fastening bolt.

18. A process for manufacturing a shackle assembly for fastening compression struts at steering knuckles in the wheel suspension of a motor vehicle comprising the steps of providing a pair of generally flat material blanks adapted to be formed, respectively, into an enveloping strap and a counter strap for said assembly; punching in each of said material blanks holes at selected predetermined locations, said holes being adapted to receive therethrough fastening bolts for said assembly, with the holes in said material blank adapted to form said counter strap being made with a larger diameter than the holes in said material blank adapted to form said enveloping strap; bending said material blanks to form an enveloping strap and a counter strap and assembling said straps together with said holes in said enveloping strap lying essentially radially within the outlines of said holes in said counter strap; said counter strap and said enveloping strap being thus formed and assembled to define a generally circular enclosure within which a compression strut may be received, said assembled straps having a pair of generally planar parallel sides extending outwardly from said enclosure to define a spacing therebetween within which a steering knuckle part may be received; said straps being thus configured so that said holes are formed through said parallel sides to receive therethrough a bolt which may also extend through a hole formed in said steering knuckle part; each of the sides of one of said straps being in abutting relationship, respectively, with one of the sides of the other of said straps, said straps each including a generally circular portion extending between said parallel sides thereof defining a part of said circular enclosure; said holes in said enveloping strap being formed by a punching operation and being subjected to a finishing operation after said punching operation.

* * * * *